United States Patent
Nam et al.

(10) Patent No.: US 12,145,465 B2
(45) Date of Patent: Nov. 19, 2024

(54) METHOD, APPARATUS AND COMPUTER PROGRAM FOR SUPPLYING POWER THROUGH GROUPING OF CHARGING MODULE FOR ELECTRIC VEHICLE

(71) Applicant: EVAR, Sujeong-gu (KR)

(72) Inventors: Junwoo Nam, Anyang-si (KR); Hun Lee, Suwon-si (KR); Donghyuk Shin, Seongnam-si (KR); Kijae Kim, Seoul (KR)

(73) Assignee: EVAR, Seongnam-si (KR)

( * ) Notice: Subject to any disclaimer, the term of this patent is extended or adjusted under 35 U.S.C. 154(b) by 582 days.

(21) Appl. No.: 17/458,197

(22) Filed: Aug. 26, 2021

(65) Prior Publication Data
US 2022/0063441 A1    Mar. 3, 2022

(30) Foreign Application Priority Data
Aug. 28, 2020    (KR) .................. 10-2020-0109271

(51) Int. Cl.
*B60L 53/67*    (2019.01)
*B60L 53/62*    (2019.01)
*B60L 53/66*    (2019.01)
*H02J 7/00*    (2006.01)

(52) U.S. Cl.
CPC .............. *B60L 53/67* (2019.02); *B60L 53/62* (2019.02); *B60L 53/66* (2019.02); *H02J 7/00032* (2020.01); *H02J 7/0013* (2013.01); *H02J 7/0048* (2020.01); *H02J 7/00712* (2020.01)

(58) Field of Classification Search
CPC ....................................... B60L 53/67
USPC ............................................. 320/109
See application file for complete search history.

(56) References Cited

U.S. PATENT DOCUMENTS

| | | | |
|---|---|---|---|
| 2015/0102775 A1* | 4/2015 | Von Novak, III | B60L 53/63 320/109 |
| 2017/0182900 A1* | 6/2017 | Ohkuma | B60L 53/50 |
| 2018/0170195 A1* | 6/2018 | Jefferies | H02J 7/0013 |

FOREIGN PATENT DOCUMENTS

| | | |
|---|---|---|
| KR | 10-1439265 B1 | 9/2014 |
| KR | 10-2017-0068877 A | 6/2017 |
| KR | 10-2019-0097392 A | 8/2019 |
| KR | 10-2041839 B1 | 11/2019 |

* cited by examiner

*Primary Examiner* — Edward Tso
*Assistant Examiner* — Ahmed H Omar
(74) *Attorney, Agent, or Firm* — Studebaker & Brackett PC

(57) ABSTRACT

A method, apparatus and computer program for supplying power through grouping of charging modules for electric vehicle are provided. A method for supplying power through grouping of charging modules for electric vehicle according to various embodiments of the present disclosure, the method being performed by a computing apparatus, the method includes outputting a first signal in response to receiving power from a power source; collecting a plurality of second signals output in response to each of external plurality of charging modules receiving power; and selecting at least one charging module from among the plurality of charging modules using a parameter of the first signal and the plurality of second signals, and grouping into one group with the selected at least one charging module.

9 Claims, 10 Drawing Sheets

[Fig. 1]
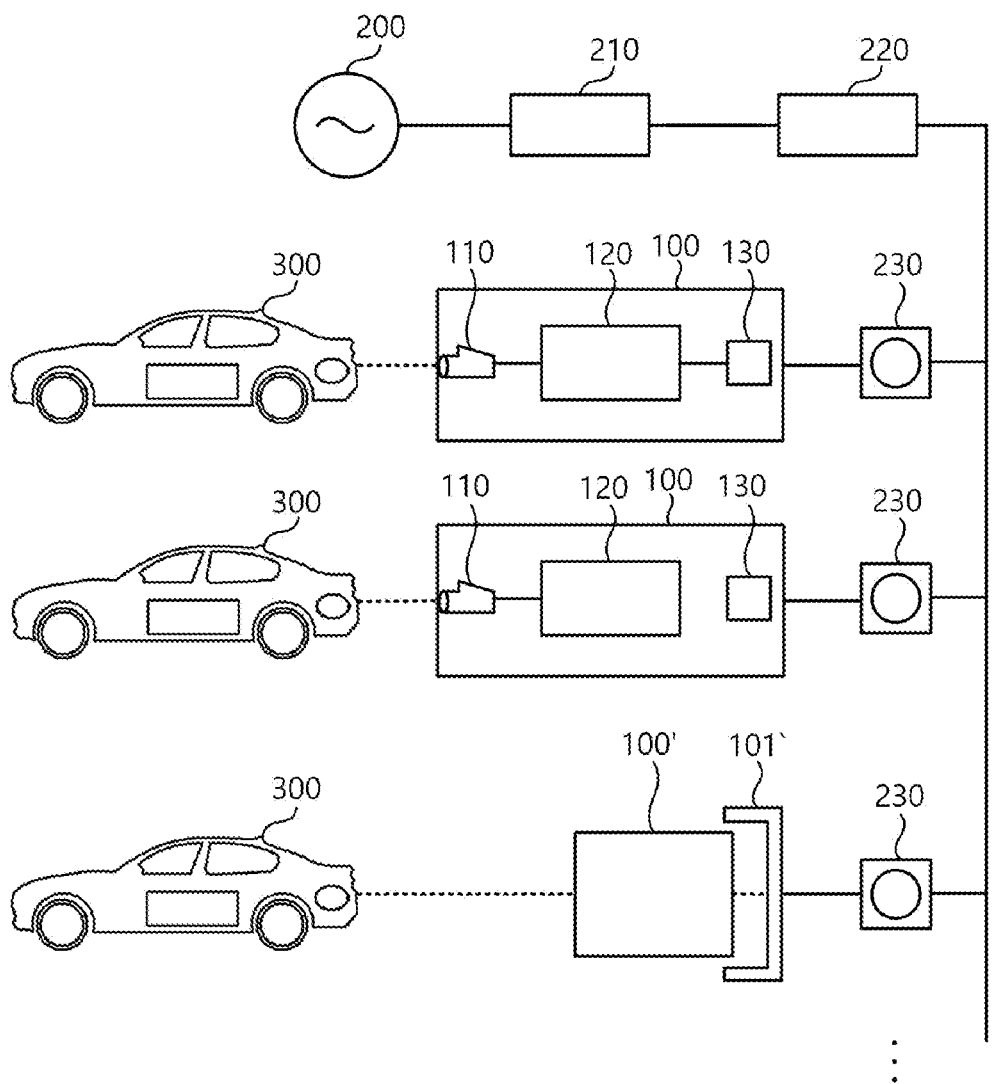

[Fig. 2]
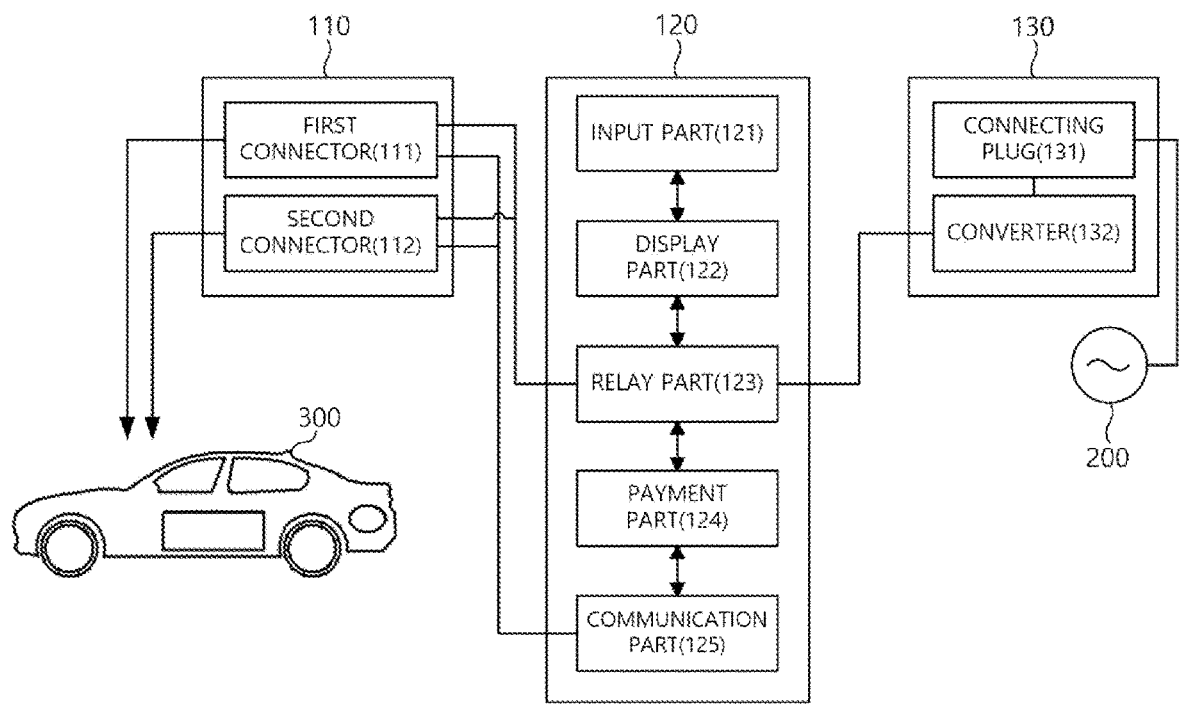

[Fig. 3]
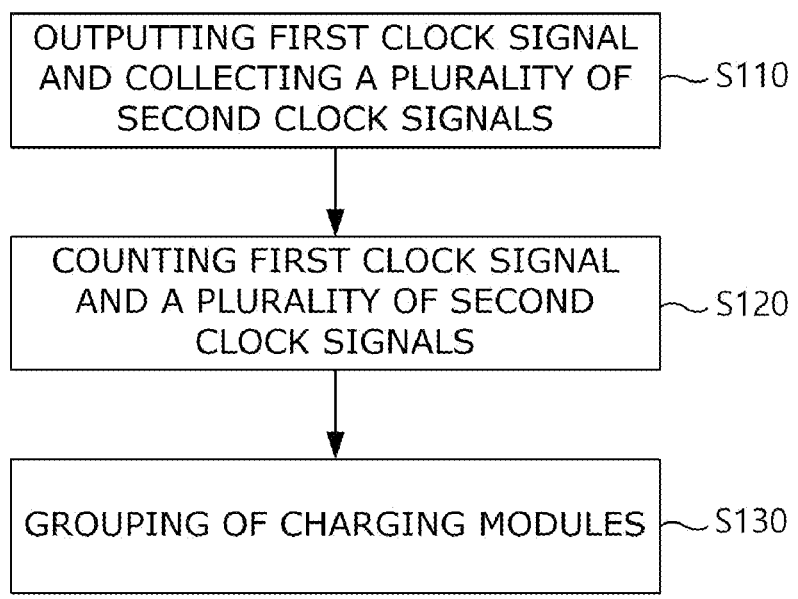

[Fig. 4]
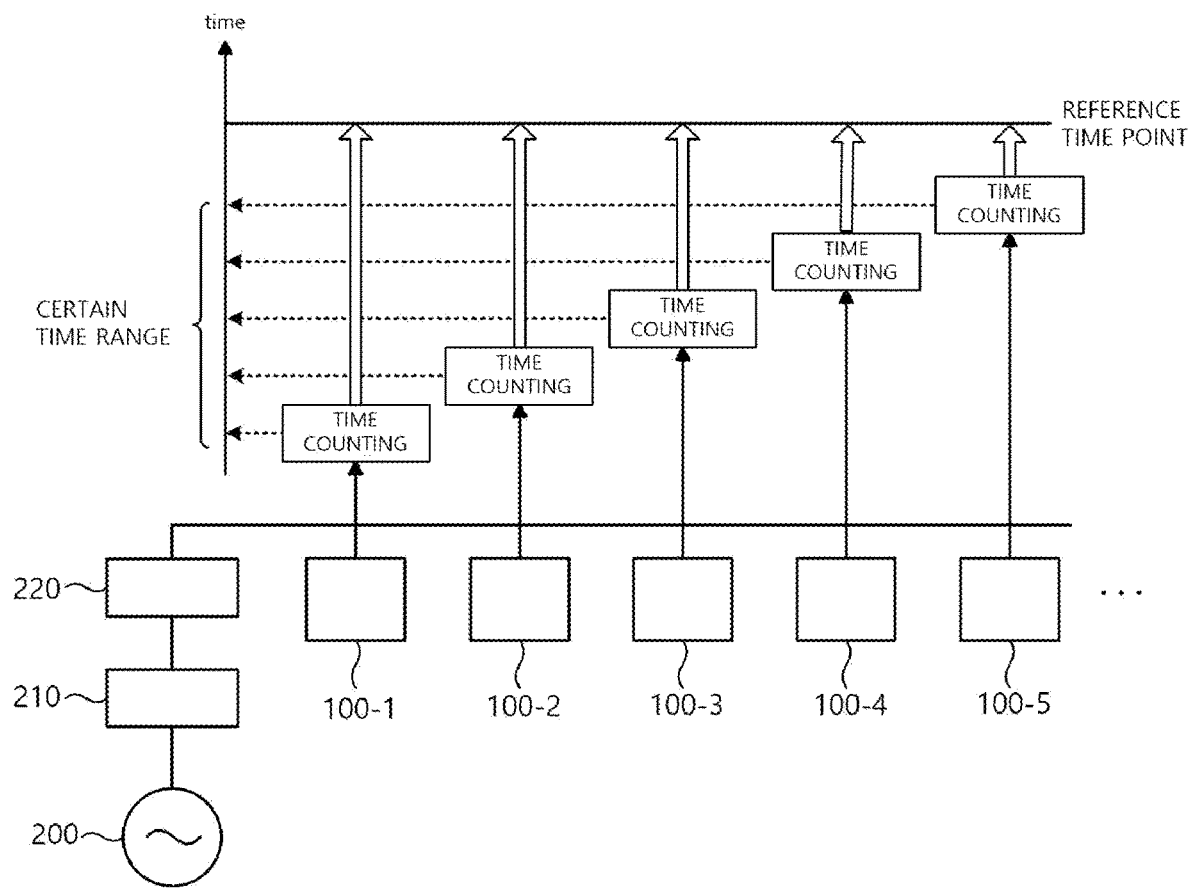

[Fig. 5]
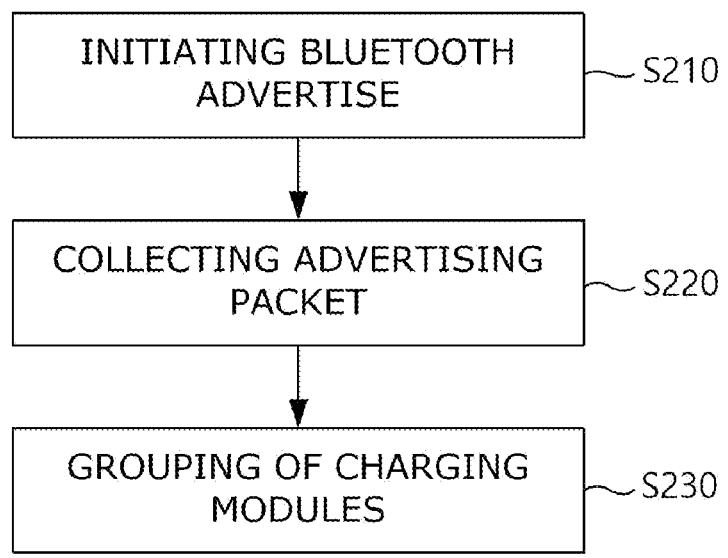

[Fig. 6]
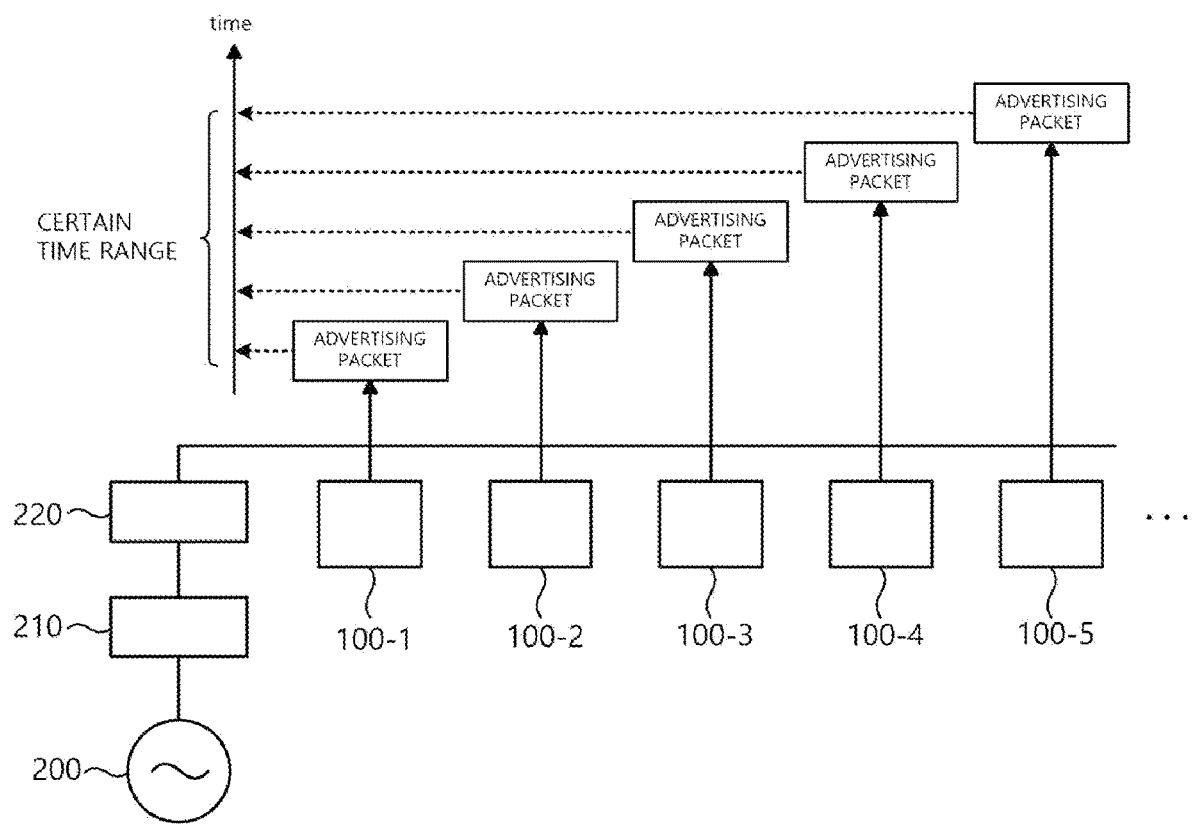

[Fig. 7]
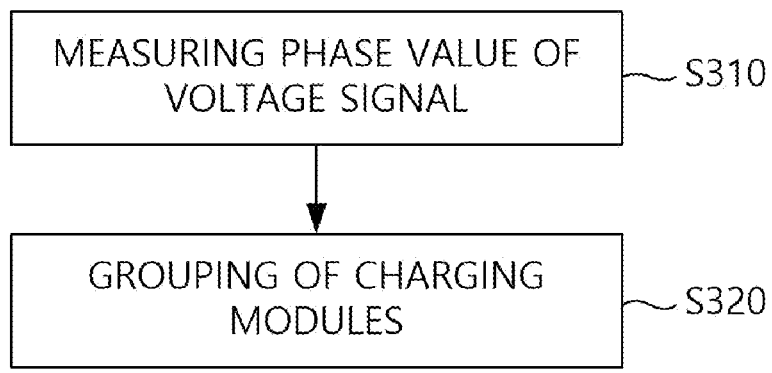

[Fig. 8]
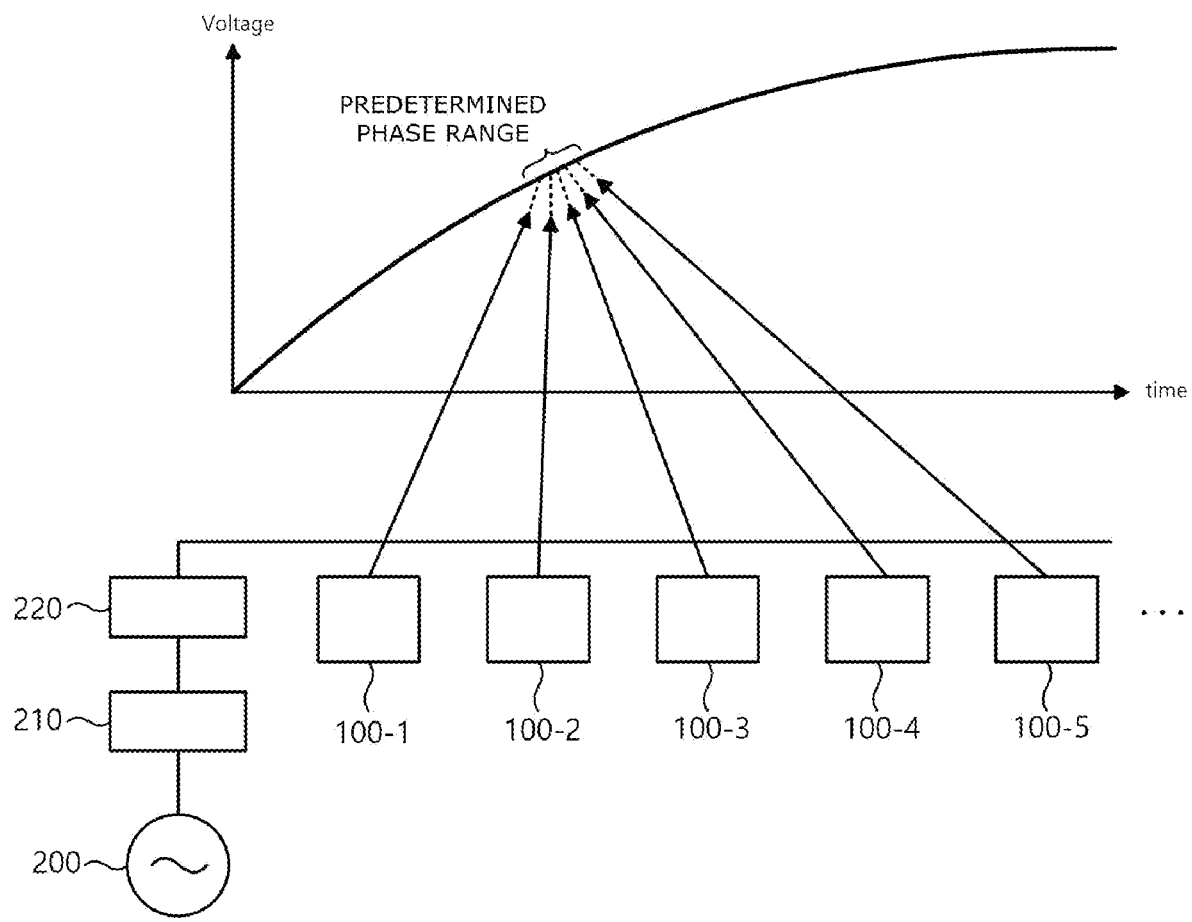

[Fig. 9]
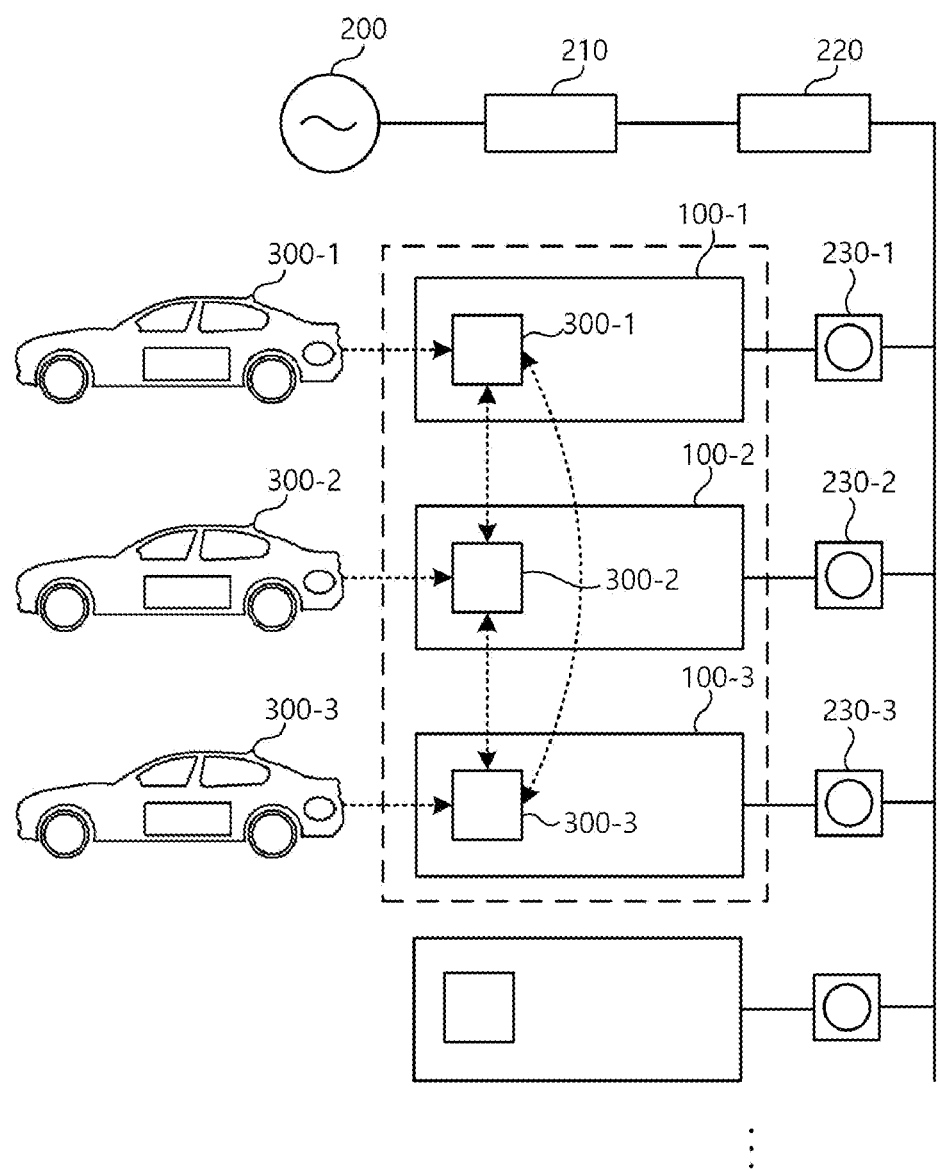

[Fig. 10]
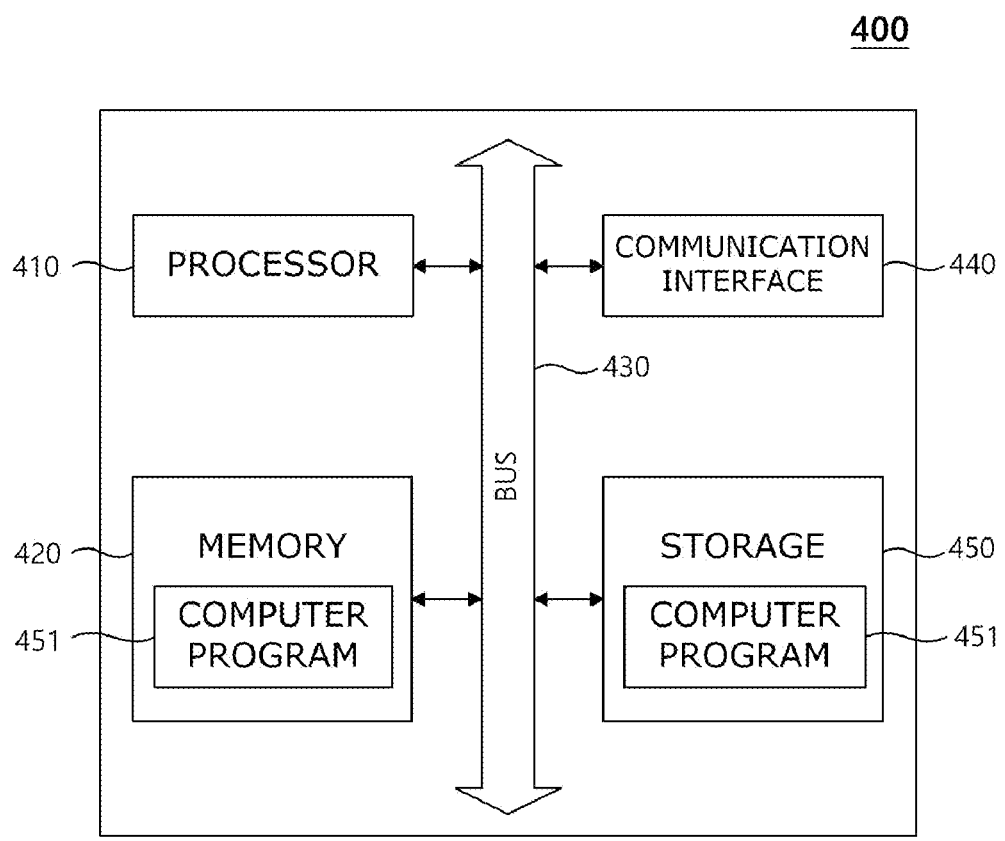

METHOD, APPARATUS AND COMPUTER PROGRAM FOR SUPPLYING POWER THROUGH GROUPING OF CHARGING MODULE FOR ELECTRIC VEHICLE

1. Field

Various embodiments of the present disclosure relate to a method, apparatus and computer program for supplying power through grouping of charging module for electric vehicle.

2. Background

Electric vehicle (EV) is a future-oriented convergence technology that is receiving interest and investments from governments and companies around the world along with global green growth policies. Accordingly, in the automobile industry, the central axis of demand of the market is rapidly changing from conventional oil-based vehicles to electric vehicles.

As the demand for electric vehicles increases, technological development for not only electric vehicles but also infrastructure construction (charging apparatuses, power supply networks, etc.) in order to smoothly use electric vehicles is also being made very actively.

However, establishment of infrastructure required by the supply of electric vehicles is insufficient, and thus various methods and technologies for charging numerous electric vehicles are being developed. Especially, in the case of office buildings and apartment houses, in terms of power operation, there is a problem that the excess of power reception capacity due to the addition of infrastructure for charging electric vehicles can affect the daily power used by residents or cause a large-scale power shortage.

In order to overcome this problem, in prior art, a main charger and a plurality of sub-chargers were provided in the power source, and the main charger was in charge of all communications with external servers as well as controlling the amount of power being supplied to the sub-chargers.

In the case of such a centralized multiple charging method of prior art, there are problems that, if the main charger goes out of order, the sub-chargers cannot be operated either, and the installation cost and maintenance cost of the main charger are quite high, and communication between the sub chargers is impossible, making it difficult to immediately distribute power.

Further, in the case of an electric vehicle charger equipped with the recently developed Energy Storage System (ESS), normally, electricity is slowly stored in the ESS, and when charging an electric vehicle, energy is rapidly released so as to reduce the burden of power reception, but even in this case, in order to increase the operation rate of the power source installed to charge the ESS, a technology is required to configure the main charger equipped with the ESS and the plurality of sub-chargers to distribute the power amount.

SUMMARY

Therefore, a purpose of the present disclosure is to resolve the problems of prior art, that is, to provide a method, apparatus and computer program for supplying power through grouping of charging module for electric vehicle, that may group, from among a plurality of charging modules, the charging modules that are connected to the same power source and receive power therefrom, as one group, and supply power to each of the charging modules according to the power amount determined through mutual information sharing between the grouped charging modules, so that an appropriate power amount can be supplied to each of the plurality of charging modules within the range of maximum power amount suppliable from the power source.

Another purpose of the present disclosure is to provide a method, apparatus and computer program for supplying power through grouping of charging module for electric vehicle, where the plurality of charging modules are not divided into a main charging module that determines the power amount to be supplied to each charging module and into sub-charging modules that receive the power amount accordingly, but instead, the main charging module and the plurality of charging modules have equal status, and the power amount to be supplied to each charging module is determined based on the information shared among the plurality of charging modules, so that the problems of the prior art centralized multiple charging method can be overcome.

Tasks to be resolved by the present disclosure are not limited to the aforementioned tasks, but other tasks not mentioned herein will also be clearly understood by those skilled in the art based on the description hereinbelow.

A method for supplying power through grouping of charging modules for electric vehicle according to an embodiment of the present disclosure, for resolving the aforementioned tasks, is provided, the method being performed by a computing apparatus, the method including outputting a first signal in response to receiving power from a power source; collecting a plurality of second signals output in response to each of external plurality of charging modules receiving power; and selecting at least one charging module from among the plurality of charging modules using a parameter of the first signal and the plurality of second signals, and grouping into one group with the selected at least one charging module.

In various embodiments, the first signal may include a first clock signal, and the plurality of second signals may include a plurality of second clock signals, and the parameter of the first signal may include a first counting value obtained by counting the first clock signal, and the parameter of the plurality of second signals may include a plurality of second counting values obtained by counting each of the plurality of second clock signals, and the grouping into one group may include selecting at least one second counting value, from among the plurality of second counting values, whose difference from the first counting value is not more than a certain size, and grouping into one group with at least one charging module corresponding to the selected at least one second counting value.

In various embodiments, the first signal may include a first clock signal, the plurality of second signals may include a plurality of second clock signals, the parameter of the first signal may include a first counting value obtained by counting the first clock signal, and the parameter of the plurality of second signals may include a plurality of second counting values obtained by counting each of the plurality of second clock signals.

The grouping into one group may include calculating a difference between the first counting value and a predetermined reference time point, to calculate a first time point regarding a time point of receiving power from the power source, and calculating a difference between the plurality of second counting values and the predetermined reference time point, to calculate a plurality of second time points regarding a time point when each of the plurality of charging modules received power; and selecting at least one second time point included within a certain time range based on the first time point from among the plurality of second time points, and grouping into one group with at least one charging module that received power at the selected at least one second time point.

In various embodiments, the calculating may include calculating a signal delay time regarding each of the plurality of charging modules using the plurality of second clock signals collected from each of the plurality of charging modules, and correcting the predetermined reference time point for each of the plurality of charging modules based on the calculated signal delay time.

In various embodiments, the calculating may include determining a unit time for counting the first clock signal and the plurality of second clock signals based on the size of the certain time range, and counting each of the first clock signal and the plurality of second clock signals based on the determined unit time, thereby calculating the first counting value and the plurality of second counting values.

In various embodiments, the method for supplying power through grouping of charging modules for electric vehicle may further include connecting with the at least one charging module grouped into one group via one communication network; transmitting first charging state information to the at least one charging module or receiving a plurality of second charging state information from each of the at least one charging module using the one communication network; and determining an amount of power to receive from the power source based on the first charging state information and the plurality of second charging state information, and requesting a supply of power according to the determined amount of power.

In various embodiments, the first signal may include a first advertising packet output as Bluetooth advertise is initiated in response to receiving power, the plurality of second signals may include a plurality of second advertising packets output as the Bluetooth advertise is initiated in response to each of the plurality of charging modules receiving power, the parameter of the first signal may include a time of outputting the first advertising packet, and the parameter of the plurality of second signals may include a time of receiving each of the plurality of second advertising packets, and the grouping into one group may include selecting at least one second advertising packet received within a certain time range based on the time of outputting the first advertising packet from among the plurality of second advertising packets, and grouping into one group with at least one charging module that transmitted the selected at least one second advertising packet.

In various embodiments, the first signal may include a first voltage signal regarding the power supplied from the power source, the plurality of second signals may include a plurality of second voltage signals regarding the power each of the plurality of charging modules received, the parameter of the first signal may include a phase value of the first voltage signal, and the parameter of the plurality of second signals may include a phase value of the plurality of second voltage signals, and the grouping into on group may include selecting at least one second voltage signal included within a certain phase range based on the phase value of the first voltage signal from among the plurality of second voltage signals, and grouping into one group with at least one charging module corresponding to the selected at least one second voltage signal.

An apparatus for supplying power through grouping of charging modules for electric vehicle according to another embodiment of the present disclosure may include a processor; a network interface; a memory; and a computer program that may be loaded in the memory, and executed by the processor, and the computer program may include an instruction for outputting a first signal in response to receiving power from a power source; an instruction for collecting a plurality of second signals output in response to each of external plurality of charging modules receiving power; and an instruction for selecting at least one charging module from among the plurality of charging modules using a parameter of the first signal and the plurality of second signals, and grouping into one group with the selected at least one charging module.

A computer program recorded in a computer-readable recording medium according to another embodiment of the present disclosure for resolving the aforementioned tasks, is provided, the computer program combined with a computing apparatus, for executing steps of outputting a first signal in response to receiving power from a power source; collecting a plurality of second signals output in response to each of external plurality of charging modules receiving power; and selecting at least one charging module from among the plurality of charging modules using a parameter of the first signal and the plurality of second signals, and grouping into one group with the selected at least one charging module.

Other specific matters of the present disclosure are included in the detailed description and drawings.

According to the various embodiments of the present disclosure, it is possible to group, from among a plurality of charging modules, the charging modules that are connected to the same power source and receive power therefrom, as one group, and supply power to each of the charging modules according to the power amount determined through mutual information sharing between the grouped charging modules, so that an appropriate power amount can be supplied to each of the plurality of charging modules within the range of maximum power amount suppliable from the power source.

Further, by not dividing the plurality of charging modules into a main charging module that determines the power amount to be supplied to each charging module and sub-charging modules that receive the power amount accordingly, but instead, allowing the main charging module and the plurality of charging modules to have equal status, to determine the power amount for each to receive based on the information shared among the plurality of charging modules, the problems of the prior art centralized multiple charging method can be overcome.

The effects of the present disclosure are not limited to the aforementioned effects, and other effects not mentioned herein will be clearly understood by those skilled in the art based on the description hereinbelow.

BRIEF DESCRIPTION OF THE DRAWINGS

FIG. 1 is a view illustrating a system for supplying power through grouping of charging modules for electric vehicle according to an embodiment of the present disclosure;

FIG. 2 is a view illustrating a system for supplying power through grouping of charging modules for electric vehicle according to another embodiment of the present disclosure;

FIG. 3 is a flowchart of a method for grouping a plurality of charging modules using counting the time power was supplied according to various embodiments;

FIG. 4 is a view illustrating a process for grouping a plurality of charging modules using counting the time power was supplied according to various embodiments;

FIG. 5 is a flowchart of a method for grouping a plurality of charging modules using an advertising packet according to various embodiments;

FIG. 6 is a view illustrating a process for grouping a plurality of charging modules using an advertising packet according to various embodiments;

FIG. 7 is a flowchart of a method for grouping a plurality of charging modules using a phase value of power being supplied to each of the plurality of charging modules according to various embodiments;

FIG. 8 is a view illustrating a process of grouping a plurality of charging modules using a phase value of the power being supplied to each of the plurality of charging modules according to various embodiments;

FIG. 9 is a view illustrating a configuration for connecting the charging modules grouped into one group via one communication network; and FIG. 10 is a hardware configuration view of an apparatus for supplying power through grouping of charging modules for electric vehicle according to another embodiment of the present disclosure.

DETAILED DESCRIPTION

Advantages and features of the present disclosure, and the method for achieving those advantages and features will be clarified with reference to the embodiments that will be described hereinbelow together with the accompanying drawings. However, the present disclosure is not limited to the embodiments disclosed hereinbelow, but may be embodied in various different forms, and the present embodiments are provided to fully complete the disclosure of the present disclosure, and to fully inform those of ordinary skill in the art to which the present disclosure pertains to about the range of the present disclosure, and the present disclosure is defined by the scope of the claims only.

The terms used in the present specification are for describing the embodiments, and not for limiting the present disclosure. As used herein, a singular form also includes a plural form unless specifically stated otherwise in the phrase. As used herein, "comprises" and/or "comprising" does not exclude the presence or addition of one or more other components in addition to the stated components. Like reference numerals refer to like elements throughout, and "and/or" includes each and every combination of one or more of the mentioned components. Although "first", "second", etc. are used to describe various components, these components are not limited by these terms, of course. These terms are only used to distinguish one component from another. Accordingly, it goes without saying that the first component mentioned below may be the second component within the spirit of the present disclosure.

Unless otherwise defined, all terms (including technical and scientific terms) used herein may have the meaning commonly understood by those of ordinary skill in the art to which the present disclosure pertains. Also, commonly used dictionary definitions are not to be interpreted ideally or excessively unless specifically defined explicitly.

As used herein, the term "part" or "module" refers to a hardware component such as software, FPGA, or ASIC, and "part" or "module" performs certain roles. However, "part" or "module" is not meant to be limited to software or hardware. A "part" or "module" may be configured to reside on an addressable storage medium or to reproduce one or more processors. Therefore, as an example, "part" or "module" may include components such as software components, object-oriented software components, class components, and task components, and processes, functions, properties, procedures, subroutines, segments of program code, drivers, firmware, microcode, circuitry, data, databases, data structures, tables, arrays and variables. Components and functions provided within "parts" or "modules" may be combined into a smaller number of components and "parts" or "modules", or may be separated into additional components and "parts" or "modules".

Spatially relative terms "below", "beneath", "lower", "above", "upper", etc. may be used to easily describe the correlation between one component and other components as illustrated in the drawings. Spatially relative terms should be understood as terms including different directions of components in use or operation in addition to the directions shown in the drawings. For example, when a component described as "below" or "beneath" of another component in the drawing is turned over, the component may be "above" other component. Therefore, the exemplary term "below" or "beneath" may include both the below/beneath and above directions. Components may also be oriented in other directions, and thus spatially relative terms may be interpreted according to orientation.

In the present specification, a computer refers to all types of hardware apparatuses including at least one processor, and may be understood as encompassing software configurations operating in the corresponding hardware apparatuses according to embodiments. For example, a computer may be understood to include, but is not limited to, smart phones, tablet PCs, desktops, notebooks, and user clients and applications running on each apparatus.

In addition, a system for supplying power through grouping of charging module for electric vehicle disclosed in the present specification may be defined as a system for charging a battery mounted onto an electric vehicle (for example: 300 of FIG. 1) or a battery mounted onto a mobile charging module (for example: 100' of FIG. 1) for charging the battery mounted onto the electric vehicle, using grid of a commercial power source or the power of an energy storage apparatus. Such a system for supplying power through grouping charging modules for electric vehicle may have various forms depending on the type of the electric vehicle. For example, the system for supplying power through grouping of charging modules for electric vehicle may include a conductive charging system using cable or a contactless power transfer system.

Further, as used herein, an electric vehicle (EV) may refer to, but is not limited to, an electric car, electric automobile, electric road vehicle (ERV), plug-in vehicle (PV), plug-in vehicle (xEV) and the like, and a power source may include a residential or commercial electric service or a generator using the fuel mounted onto a vehicle and the like.

In addition, as used herein, a connection between the electric vehicle and a charging module may not only refer to a procedure in which the electric vehicle is electrically connected with a connector (or wireless charging apparatus) disposed such that the power being supplied from the power source can be supplied to the electric vehicle through the charging module, but also to a process in which the information necessary for instructions and control communication, controlling and ending is exchanged between the electric vehicle and the charging module. Further, the connection between the electric vehicle and the charging module may be interpreted to include, but not limited to, a state where the electric vehicle and the charging module are directly coupled for charging, as well as a state in which the electric vehicle and the charging module are scheduled for charging.

In addition, in the present specification, a charging module may include wired charging method as well as wireless charging method. A wireless power charging system may refer to a system for control between GA and VA including wireless power transfer and alignment and communication. Further, wireless power transfer may refer to transferring electric power to an electric vehicle through a contactless means in an AV power supply network.

In addition, in the present specification, charging modules can communicate with one another, and communication between the charging modules may be applied in various methods. For example, Bluetooth method in which communication is made within a short distance of not more than 10 m, Beacon method in which communication is made within a short distance of not more than 70 m, Addictive Links Online Hawaii Area (ALOHA) which is a contention-type multiple access protocol that randomly accesses a common transport channel without central control, Wi-Fi, PLC communication and P2P communication may be applied, but without limitation thereto.

Further, the charging module disclosed in the present specification may be a charging module capable of performing either one of a fast charging operation or a slow charging operation, or both, but there is no limitation thereto.

Hereinbelow, an embodiment of the present disclosure will be described in detail with reference to the drawings attached.

Each step described in the present specification is described as being performed by a computer, but the subject of each step is not limited thereto, and at least a portion of each step may be performed in different apparatuses according to embodiments.

FIG. 1 is a view illustrating a system for supplying power through grouping of charging modules for electric vehicle according to an embodiment of the present disclosure.

Referring to FIG. 1, a system for supplying power through grouping of charging modules for electric vehicle according to an embodiment of the present disclosure may include a power source 200 and a plurality of charging modules 100 for receiving power from the power source 200.

Here, the system for supplying power through grouping of charging modules for electric vehicle illustrated in FIG. 1 is according to an embodiment, and components thereof are not limited to the embodiment illustrated in FIG. 1, and may be added, changed or deleted as necessary.

In one embodiment, the power source 200 may be connected to the plurality of charging modules 100, and may supply power according to an amount of power predetermined for each of the plurality of charging modules 100. For this purpose, the power source 200 may include a power distribution box 210, a meter 220 and a power supply part 230. For example, the power source 200 may be connected to the charging module 100 via the power distribution box 210, the meter 220 and the power supply part 230, and may supply power to the charging module 100 connected with the power supply part 230.

The power distribution box 210 may receive power from the power source 200 and supply the power to the power supply part 230, and may block the supply of power from the power source 200 when an abnormality such as a failure occurs.

The meter 220 may measure and record the total amount of power used during a certain period of time. For example, the meter 220 may be a measuring instrument that measures and records the total amount of power used, but there is no limitation thereto.

The power supply part 230 may be directly connected with the plurality of charging modules 100, and supply the power being supplied from the power source 200 to the plurality of charging modules 100. For example, the power supply part 230 may be a power socket 230, but there is no limitation thereto.

In various embodiments, the power that the power source 200 supplies may be directly connected with the charging module 100 through a wire without the power supply part 230, but there is no limitation thereto, and thus depending on the installation environment or the properties of the charging module 100, the power supply part 230 may be selectively applied.

Here, the power source 200 may have a limit power that it can supply, and this limit power may be defined as the maximum amount of power that the power source 200 can supply. Based on a building, the maximum power that can be supplied to a building may be defined as the maximum amount of power.

In one embodiment, the charging module 100 may have one side connected with the power supply part 230 to receive power supplied from the power source 200 through the power supply part 230, and the other side electrically connected with an electric vehicle 300 to supply the power supplied from the power source 200 to the electric vehicle 300, thereby charging a battery provided in the electric vehicle 300 using the power supplied from the power source 200. For this purpose, the charging module 100 may include a connector 110 that is connected with the electric vehicle 300, a control part 120 that controls each operation of the charging module 100, and an connecting part 130 that is connected with the power supply part 230.

In various embodiments, in the case of selecting a wireless method or additionally including a wireless method, the charging module 100 may further include a wireless charging panel.

In various embodiments, the charging module 100 may be configured in plural number, and at least one charging module 100, from among the plurality of charging modules 100, may be connected to one power source 200. Here, the number of charging modules 100 connected to one power source 200 may be determined depending on the maximum amount of power suppliable from each power source 200.

In various embodiments, as illustrated in FIG. 1, the charging module 100 may further include a mobile type charging module 100' as well as the fixed type charging module 100.

The fixed type charging module 100 is fixed by being coupled with the power source 230 in hardware, and may be connected with the electric vehicle 300 located within a certain distance (determined according to the length of a charging line of the fixed type charging module 100), to charge the battery of the electric vehicle 300.

The mobile type charging module 100' may include a power supply connecting part 101' that is connected with the power supply part 230 by being coupled with the power supply part 230 in hardware, a battery that is separately provided inside the mobile type charging module 100', and a mobile means. The mobile type charging module 100' may receive power of the power source 200 through the power supply connecting part 101' and the power supply part 230, and charge the battery, and directly move to where the electric vehicle 300 is parked using the mobile means, and may be connected with the parked electric vehicle 300 and charge the battery of the electric vehicle 300 using the power of the battery provided in the mobile type charging module 100'.

Here, in response to obtaining a charging request by means of an application or various communication means, the mobile type charging module 100' may move to where the electric vehicle 300 is located and then proceed with charging the electric vehicle 300 according to a charging request signal, but there is no limitation thereto.

In various embodiments, in the plurality of charging modules 100, at least one of the wired charging method and the wireless charging method may be applied, and the wired and/or wireless charging method may be applied in both the fixed type charging module 100 and the mobile type charging module 100'.

In various embodiments, the control part 120 provided inside each of the plurality of charging modules 100 may select at least one charging module 100 from among the plurality of charging modules 100, using a parameter of a first signal output in response to receiving power from the power source 200 and of a plurality of second signals collected from external charging modules 100, and group into one group with the selected at least one charging module 100.

Here, the first signal may be a signal that each of the plurality of charging modules 100 outputs itself in response to power supply, and the second signal may mean a signal of collection of signals output by each of the external charging modules 100.

Further, the control part 120 provided inside each of the at least one charging module 100 grouped into one group may connect the at least one charging module 100 included in one group via one communication network, and control so as to share information (for example: charging amount, charging operation information (fast charging and slow charging), charging state (for example: awaiting charging, charging, charging finished)) between the at least one charging module 100, and determine the amount of power to be supplied from the power source 200 according to the shared information, and control so that the amount of power can be received according to the determined amount of power.

For this purpose, each of the plurality of charging modules 100 may perform an operation of outputting a first signal in response to receiving power from the power source 200, an operation of collecting a plurality of second signals output in response to each of the external plurality of charging modules receiving power, and an operation of selecting at least one charging module, from among the plurality of charging modules, using a parameter of the first signal and of the plurality of second signals, and grouping into one group with the selected at least one charging module, but there is no limitation thereto.

As disclosed above, in order to overcome the problems of a centralized multi-charging method of prior art, each of the plurality of charging modules 100 may perform an operation of grouping the plurality of charging modules 100 through the control part 120 provided inside, an operation of determining the amount of power through mutual sharing of information between the grouped charging modules 100, and an operation of receiving power according to the determined amount of power. However, there is no limitation thereto, and in some cases, each operation may be performed using any one charging module 100, from among the plurality of charging modules 100, or through a server (not illustrated) separately provided outside the plurality of charging modules 100.

In one embodiment, the electric vehicle 300 may include a communication controller (not illustrated) for communicating with another external apparatus, and the electric vehicle 300 may communicate with the connector 110 and a user terminal using the communication controller. Generally, only when the charging module 100 is a DC fast charging module 100, the communication is made between the electric vehicle 300 and the charging module 100. On the other hand, in the case of the slow charging module 100, communication is generally not made between the charging module 100 and the electric vehicle 300. Hereinbelow, referring to FIG. 2, the configuration of each of the plurality of charging modules 100 will be described in detail.

FIG. 2 is a view illustrating a system for supplying power through grouping of charging modules for electric vehicle according to another embodiment of the present disclosure.

Referring to FIG. 2, in one embodiment, the connector 110 may include a first connector 111 and a second connector 112 that are directly connected with the electric vehicle 300 to supply power.

The first connector 111 is a charging terminal for supporting a combo 1 method charging, and may be formed in a combined form of a single-phase AC slow charging type socket and a DC fast charging type socket. This is mainly used in the United States.

The second connector 112 is a charging terminal for supporting a combo 2 method charging, and may be formed in a combined form of a three-phase AC slow charging socket and a DC fast charging socket.

In the case of the second connector 112, since there are various charging methods supported such as DC single charging, DC and three-phase AC power, DC and single-phase AC power, and three-phase AC single charging, it has the advantage of being applicable to a variety of situations and vehicles than when using the first connector 111.

Meanwhile, the present specification is not limited to what is disclosed herein regarding the connector 110, and at least one method of the first connector 111 and the second connector 112 may be applied in the connector 110, and not only that, another form of connector such as a 31772 slow connector may be applied. In the case of another embodiment, the charging module 100 may not be provided with a connector and a cable. In such a case, only a socket may be installed in the charging module 100, and the connector or a cable may be separately purchased and used by a user who intends to use the corresponding charging module 100.

In one embodiment, as illustrated in FIG. 10, the control part 120 may include one or more processor or memory. The control part 120 may perform a communication with another charging module 100 connected with the same power source 200 (for example: another charging module 100 grouped into one group) and may control the amount of power being supplied to the electric vehicle 300.

In various embodiments, the control part 120 may include an input part 121, a display part 122, a relay part 123, a payment part 124, and a communication part 125. However, some of the aforementioned components may be omitted, and a separate configuration may be further added when necessary. Here, the description about the configuration of the control part 120 is for describing the operation of the charging module 100 according to an embodiment of the present disclosure, and there is no limitation thereto.

The input part 121 may have a plurality of keys for inputting information about a charging request, and data about an input key may be transmitted to the control part 120. For example, by inputting a key, it may be possible to input charging reservation, immediate start and end of charging, charging reservation time, numerical information, user information and vehicle information.

In various embodiments, the input part 121 may be replaced with a touch part expressed on a display instead of a physical key. However, a charging module 100 according to another embodiment may not include the input part 121, and various methods for controlling the charging module 100 even without a separate input part 121 may be applied.

The display part 122 may display information such as operation state information of whether the charging module 100 is being charged or in a waiting state, price per watt (W) or kilowatt (kW) of charging power, amount of battery remaining, battery full power, full charging time and the like. However, the display part 122 may not be provided depending on the charging module 100.

The relay part 123 may include a relay (for example: IGBT), and may connect the output power of the converter 132 to the first connector 111 or the second connector 112 according to the control of the control part 120. If there is only one combo configuring the connector 110, the configuration of the relay part 150 may be omitted.

The payment part 124 is an apparatus such as a card reader, a cash counting apparatus and a SIM reader, that may provide payment information about the charging power used by the user, to the control part 120. However, a plurality of charging modules 100 according to various embodiments may not include the payment part 124 except for any one charging module 100. The remaining charging modules 100 that do not include the payment part 124 may transmit information about the charging power used by the user to the charging module 100 that includes the payment part 124. The charging module 100 that includes the payment part 124 may further include a separate communication apparatus that can communicate with an external server, and this will be described in detail later on.

In various embodiments, the plurality of charging modules 100 may not include the payment part 124. The charging power information used by the user and measured in each charging module 100 may be connected with the user's payment means through any one charging module 100 connected with the external server. The user's payment means may be card information registered in an application or account information that the user pre-registered.

The communication part 125 can enable communication between the plurality of charging modules 100, and may mutually share information about each charging module 100 using the Power Line Communication (PLC) method or the P2P communication method. Pulse Width Modulation (PWM) communication, Controller Area Network (CAN) communication, Media Oriented Systems Transport (MOST) communication, Local Interconnect Network (LIN) communication, Bluetooth communication, ALOHA communication, Beacon communication and the like may be utilized besides the PLC communication or the P2P communication.

The communication part 125 may be used when transmitting or receiving information of whether each charging module 100 is being charged or in a waiting state, information of whether the electric vehicle is connected, information of whether charging has finished, information of the amount of power used when charging each electric vehicle and the amount of power suppliable.

Further, the communication part 125 may be used when transmitting or receiving other information related to charging as well. For example, depending on a signal of the control part 120, the communication part 125 may involve in the operation of the first connector 111 or the second connector 112, and a communication can be made with a parked electric vehicle 300.

In one embodiment, the connecting part 130 may include an connecting plug 131 that is connected with the power source 230 and the converter 132 that converts voltage.

The converter 132 may include both an AC/DC converter function and a DC/DC converter function, and the converter 132 may supply appropriate power depending on the type of the connector (combo) to which the electric vehicle 300 is connected and depending on whether the charging mode selected by the user is a fast charging mode or a slow charging mode.

In various embodiments, based on the amount of power determined by performing communication between the plurality of charging modules 100 by the communication part 125 included in each of the plurality of charging modules 100 grouped into one group, the converter 132 may adjust the amount of power being supplied to each of the plurality of charging modules 100. Hereinbelow, referring to FIGS. 3 to 10, a method for determining the amount of power allocated to each of the plurality of charging modules 100, and grouping the plurality of charging modules 100 in order to supply power based on the determined amount of power, will be described.

FIG. 3 is a flow chart of a method for grouping a plurality of charging modules using counting the time power was supplied according to various embodiments, and FIG. 4 is a view illustrating a process for grouping a plurality of charging modules using counting the time power was supplied according to various embodiments.

Referring to FIGS. 3 and 4, in various embodiments, a first charging module 100-1 (for example: any one charging module from among the plurality of charging modules 100 or a control part included in any one charging module from among the plurality of charging modules 100) may count a first clock signal output in response to receiving power from the power source 200 and a plurality of second clock signals collected from the external plurality of charging modules (for example: a second charging module 100-2, a third charging module 100-3, a fourth charging module 100-4 and a fifth charging module 100-5, excluding the first charging module 100-1, from among the plurality of charging modules 100), and may group into one group with at least one charging module, from among the external plurality of charging modules, using the counted value.

Here, a method for grouping a plurality of charging modules using counting the time power was supplied according to various embodiments of the present disclosure was described to be performed by the first charging module 100-1, from among the plurality of charging modules 100, but that was just an example to describe the method for grouping the plurality of charging modules using counting the time power was supplied according to various embodiments, and there is no limitation thereto, and thus the method may be individually performed by each of the plurality of charging modules 100.

At step 110, the first charging module 100-1 may output a first signal in response to receiving power from the power source 200. Here, the first signal may mean a first clock signal that the first charging module 100-1 itself outputs in response to the first charging module 100-1 receiving power, but there is no limitation thereto.

Further, the first charging module 100-1 may collect a plurality of second signals output in response to each of the second charging module 100-2, the third charging module 100-3, the fourth charging module 100-4, and the fifth charging module 100-5, that are external charging modules, receiving power. Here, the second signal may mean a second clock signal output in response to the second charging module 100-2, the third charging module 100-3, the fourth charging module 100-4, and the fifth charging module 100-5, located adjacent to the first charging module 100-1, receiving power, but there is no limitation thereto.

Here, the clock signal output in response to each of the plurality of charging modules 100 receiving power is divided into the first clock signal and the second clock signal, but this division is simply for the purpose to classify the subject of outputting the clock signal (for example: the first clock signal referring to the clock signal that the charging module outputs itself and the second clock signal referring to the clock signal collected from the external charging modules), and thus depending on the subject of outputting the clock signal, the first clock signal may of course be the second clock signal within the technical spirit of the present disclosure.

For example, the first charging module 100-1 may output the first clock signal in response to receiving power from the power source 200, and may collect the second clock signal output in response to each of the second charging module 100-2 and the third charging module 100-3, that are adjacent to the first charging module 100-1, receiving power.

For example, the second charging module 100-2 may output the first clock signal in response to receiving power from the power source 200, and may collect the second clock signal output by each of the first charging module 100-1 and the third charging module 100-3, that are adjacent to the second charging module 100-2.

Further, the third charging module 100-3 may output the first clock signal in response to receiving power from the power source 200, and may collect the second clock signal output by each of the first charging module 100-1 and the second charging module 100-2, that are adjacent to the third charging module 100-3.

That is, the clock signal output by the first charging module 100-1 may be interpreted as the first clock signal from the viewpoint of the first charging module 100-1, but may be interpreted as the second clock signal from the viewpoint of each of the other charging modules, that are adjacent to the first charging module 100-1.

At step 120, the first charging module 100-1 may count the first clock signal and the plurality of second clock signals obtained through step 110.

For example, the first charging module 100-1 may calculate a first counting value referring to the number of clocks of the first clock signal by counting the number of clocks of the first clock signal output in response to receiving power from the power source 200, in every preset unit of time.

Further, the first charging module 100-1 may calculate a plurality of second counting values referring to the number of clocks of each of the plurality of second clock signals by counting the number of clocks of the plurality of second clock signals collected from each of the second charging module 100-2, the third charging module 100-3, the fourth charging module 100-4, and the fifth charging module 100-5, that are external charging modules, in every preset unit of time.

Here, the preset unit of time may be any one of a milli-second (msec), a micro-second (μsec) and a nano-second (nsec), and may be determined according to a certain time range that becomes a reference for grouping the plurality of charging modules 100 at step 130 that will be described hereinafter.

In various embodiments, the first charging module 100-1 may not directly count the plurality of second clock signals collected from each of the second charging module 100-2, the third charging module 100-3, the fourth charging module 100-4, and the fifth charging module 100-5, that are external charging modules, and may collect the calculated second counting value as each of the second charging module 100-2, the third charging module 100-3, the fourth charging module 100-4, and the fifth charging module 100-5, that are external charging modules, counts the second clock signal itself.

In various embodiments, in the case of outputting the clock signal in response to a new charging module, located in an adjacent distance, receiving power, the first charging module 100-1 may recalculate the counting value by resetting the first counting value and the second counting value calculated before the new charging module output the clock signal, and recounting the clock signal in consideration of the plurality of clock signals considered before the new charging module output the clock signal and the clock signal output by the new charging module.

For example, in the case where the first charging module 100-1 is receiving power from the first power source and the second charging module 100-2 (new charging module) and the first power source are electrically connected, it is possible to reset the first counting value obtained by counting the first clock signal output from the first charging module 100-1, and recount the first clock signal and the second clock signal collected from the second charging module 100-2, to recalculate the first counting value and the second counting value, respectively.

At step 130, the first charging module 100-1 may use the first counting value and the plurality of second counting values calculated via step 120, to group at least one charging module, from among the second charging module 100-2, the third charging module 100-3, the fourth charging module 100-4, and the fifth charging module 100-5, that are external charging modules, and the first charging module 100-1, into one group.

In various embodiments, the first charging module 100-1 may select at least one second counting value, whose difference from the first counting value is not more than a certain size, from among the plurality of second counting values, and may group at least one charging module corresponding to the selected at least one second counting value into one group with the first charging module 100-1.

In various embodiments, the first charging module 100-1 may use the difference between the first counting value and the predetermined reference time point (for example: present time point), to calculate a first time point, that refers to the time point when power was supplied from the power source 200, and may use the difference between the plurality of second counting values and the predetermined reference time point, to calculate a plurality of second time points, that refer to the time point when each of the second charging module 100-2, the third charging module 100-3, the fourth charging module 100-4, and the fifth charging module 100-5 received power.

For example, it is possible to receive the reference time point for each of the external plurality of charging modules (for example: the second charging module 100-2, the third charging module 100-3, the fourth charging module 100-4, and the fifth charging module 100-5) from a relay apparatus (for example: gateway) that connects the first charging module 100-1 with each of the plurality of charging modules, and use the difference between the reference time point of each of the external plurality of charging modules received from the relay apparatus and the plurality of second counting values, to calculate a second time point for each of the external plurality of charging modules.

Here, the first charging module 100-1 may consider that delay of signal occurs in the process of receiving the second clock signal from each of the external plurality of charging modules (for example: the second charging module 100-2, the third charging module 100-3, the fourth charging module 100-4, and the fifth charging module 100-5) and in the process of receiving the reference time point of each of the external plurality of charging modules from the relay apparatus, and use the second clock signal collected from each of the external plurality of charging modules, to calculate a signal delay time for each of the external plurality of charging modules, and use the calculated signal delay time, to correct the predetermined reference time point for each of the external plurality of charging modules.

Thereafter, the first charging module 100-1 may select at least one second time point that is included within a certain time range based on the first time point from among the plurality of second time points, and group at least one charging module 100 corresponding to the selected at least one second time point (for example: the charging module that received power at the at least one second time point) into one group with the first charging module 100-1.

Here, the certain time range may be a preset time range according to the user and manager performing the method for supplying power through grouping of charging modules for electric vehicle using a computing apparatus, but there is no limitation thereto.

That is, in the case where the plurality of charging modules 100 are connected to one power source 200 and receive power from the one power source 200, a difference in time to receive power may occur depending on the order in which they are connected, but when connected to the same power source 200, the difference is very small.

Therefore, it is possible to judge the power supply time point of each of the plurality of charging modules 100, and group at least one charging module 100 that received power at a similar time point, thereby grouping the charging modules 100, that are adjacent to each other (connected to one power source 200), into one group.

FIG. 5 is a flowchart of a method for grouping a plurality of charging modules using an advertising packet according to various embodiments, and FIG. 6 is a view illustrating a process for grouping a plurality of charging modules using an advertising packet according to various embodiments.

Referring to FIGS. 5 and 6, in various embodiments, the first charging module 100-1 (for example: any one charging module, from among the plurality of charging modules 100, or the control part included in any one charging module) may use an advertising packet output in response to receiving power from the power source 200 and a plurality of advertising packets collected from the external plurality of charging modules (for example: the second charging module 100-2, the third charging module 100-3, the fourth charging module 100-4, and the fifth charging module 100-5, excluding the first charging module 100-1, from among the plurality of charging modules 100), to be grouped into one group with at least one charging module, from among the plurality of charging modules.

Here, the method for grouping the plurality of charging modules using the advertising packet according to various embodiments of the present disclosure is described as being performed by the first charging module 100-1, from among the plurality of charging modules 100, but this is merely an example for describing the method for grouping the plurality of charging modules using the advertising packet according to various embodiments, and there is no limitation thereto, and thus the method may be performed individually by each of the plurality of charging modules 100.

At step 210, each of the plurality of charging modules 100 (for example: the first charging module 100-1, the second charging module 100-2, the third charging module 100-3, the fourth charging module 100-4, and the fifth charging module 100-5) may initiate Bluetooth Advertise in response to receiving power, thereby communicating with the plurality of charging modules 100. For example, each of the plurality of charging modules 100 may be paired with a Master device separately provided in a location adjacent to the power source 200 so that each of the plurality of charging modules 100 are connected with the Master device as a Slave device, but there is no limitation thereto.

At step 220, in response to initiating Bluetooth Advertise via step 210, the first charging module 100-1 may output a first signal. Here, the first signal may mean a first advertising packet generated in response to the pairing with the Master device, but there is no limitation thereto.

In addition, the first charging module 100-1 may collect a plurality of second signals output in response to each of the second charging module 100-2, the third charging module 100-3, the fourth charging module 100-4, and the fifth charging module 100-5, that are external charging modules, initiating Bluetooth Advertise. Here, the plurality of second signals may mean a plurality of second advertising packets generated in response to the pairing of the second charging module 100-2, the third charging module 100-3, the fourth charging module 100-4, and the fifth charging module 100-5, located adjacent to the first charging module 100-1, with the Master device, but there is no limitation thereto.

Here, the advertising packet output as each of the plurality of charging modules 100 initiates Bluetooth Advertising is divided into a first advertising packet and a second advertising packet, but this division is simply for the purpose to classify the subject of outputting the advertising packet (for example: the first advertising packet referring to the advertising packet that the charging module outputs itself and the second advertising packet referring to the advertising packet collected from the external charging modules), and thus depending on the subject of outputting the advertising packet, the first advertising packet may of course be the second advertising packet within the technical spirit of the present disclosure.

That is, the advertising packet output by the first charging module 100-1 may be interpreted as the first advertising packet from the viewpoint of the first charging module 100-1, but may be interpreted as the second advertising packet from the viewpoint of each of the other charging modules, that are adjacent to the first charging module 100-1.

At step 230, the first charging module 100-1 may select at least one second advertising packet output within a certain time range based on the time the first advertising packet is output from among the plurality of second advertising packets, and may group at least one charging module corresponding to the selected at least one second advertising packet (for example: at least one charging module that output at least one second advertising packet) into one group with the first charging module 100-1.

In various embodiments, the first charging module 100-1 may calculate the first time point that refers to the time point of initiating Bluetooth Advertise using the first advertising packet, and use the plurality of second advertising packets to calculate the plurality of second time points that refer to the time point when each of the external plurality of charging modules (for example: the second charging module 100-2, the third charging module 100-3, the fourth charging module 100-4, and the fifth charging module 100-5) initiated Bluetooth Advertise.

Thereafter, the first charging module 100-1 may select at least one charging module included within a certain time range based on the first time point, from among the plurality of second time points, and may group the selected at least one charging module and the first charging module 100-1 into one group.

Here, the certain time range may be a preset time range according to the user and manager performing the method for supplying power through grouping of charging modules for electric vehicle using a computing apparatus, but there is no limitation thereto.

That is, even when the plurality of charging modules 100 transceive signals using the same communication network, a difference in time to transceive a signal may occur depending on the location and distance of each of the plurality of charging modules 100, but when connected to the same power source 200, the difference is very small.

Therefore, the plurality of charging modules 100 may judge the signal transceiving time point of each of the plurality of charging modules 100, and group at least one charging module 100 that transceived a signal at a similar time point, thereby grouping the charging modules 100, that are adjacent to each other (connected to one power source 200), into one group.

FIG. 7 is a flowchart of a method for grouping a plurality of charging modules using a phase value of power being supplied to each of the plurality of charging modules according to various embodiments, and FIG. 8 is a view illustrating a process of grouping a plurality of charging modules using a phase value of the power being supplied to each of the plurality of charging modules according to various embodiments.

Referring to FIGS. 7 and 8, in various embodiments, the first charging module 100-1 (for example: any one charging module, from among the plurality of charging modules 100, or the control part included in any one charging module) may use a voltage signal regarding the power supplied from the power source 200 and a voltage signal collected from each of the external plurality of charging modules (for example: the second charging module 100-2, the third charging module 100-3, the fourth charging module 100-4, and the fifth charging module 100-5, excluding the first charging module 100-1, from among the plurality of charging modules 100), to be grouped into one group with at least one charging module, from among the plurality of charging modules.

Here, the method for grouping the plurality of charging modules using the phase value of the power supplied to each of the plurality of charging modules according to various embodiments of the present disclosure is described as being performed by the first charging module 100-1, from among the plurality of charging modules 100, but this is just an example for describing the method for grouping the plurality of charging modules using the phase value of the power supplied to each of the plurality of charging modules according to various embodiments of the present disclosure, and there is no limitation thereto, and may be individually performed by each of the plurality of charging modules 100.

At step 310, in response to receiving power from the power source 200, the first charging module 100-1 may output a first signal regarding the power supplied from the power source 200. Here, the first signal may mean a first voltage signal regarding the power supplied from the power source 200, but there is no limitation thereto.

Further, the first charging module 100-1 may collect a plurality of second signals output in response to each of the second charging module 100-2, the third charging module 100-3, the fourth charging module 100-4, and the fifth charging module 100-5, that are external charging modules, receiving power. Here, the plurality of second signals may mean a plurality of second voltage signals output in response to the second charging module 100-2, the third charging module 100-3, the fourth charging module 100-4, and the fifth charging module 100-5, that are located adjacent to the first charging module 100-1, receiving power, but there is no limitation thereto.

Thereafter, the first charging module 100-1 may use the first voltage signal and the plurality of second voltage signals, to measure the phase value of the power supplied to each of the plurality of charging modules 100. For example, the first charging module 100 may be separately provided with a measurement circuit for measuring the phase value of power, and may use the separately provided measurement circuit, to measure the phase value for each of the first voltage signal and the plurality of second voltage signals. However, there is no limitation thereto, and various methods for measuring the phase value of power may be applied.

Here, the voltage signal output by each of the plurality of charging modules 100 are divided into the first voltage signal and the second voltage signal, but this division is simply for the purpose to classify the subject of outputting the voltage signal (for example: the first voltage signal referring to the voltage signal that the charging module outputs itself and the second voltage signal referring to the voltage signal collected from the external charging modules), and thus depending on the subject of outputting the voltage signal, the first voltage signal may of course be the second voltage signal within the technical spirit of the present disclosure.

That is, the voltage signal output from the first charging module 100-1 may be interpreted as the first voltage signal from the viewpoint of the first charging module 100-1, but may be interpreted as the second voltage signal from the viewpoint of each of the other charging modules, adjacent to the first charging module 100-1.

At step 320, the first charging module 100-1 may select at least one second voltage signal included within a certain phase range based on the phase value of the first voltage signal, from among the plurality of second voltage signals, measured at step 310, and may group at least one charging module corresponding to the selected at least one second voltage signal and the first charging module 100-1 into one group.

Generally, the power being supplied from the power source 200 is 220V/60 Hz, that has a cycle of about 166.666 ms as illustrated in FIG. 8, and thus in the case of supplying power to each of the plurality of charging modules 100 in certain time intervals, power having different phase values will be supplied. However, in the case where the plurality of charging modules 100 are adjacent to one another (for example: within 100 m) and are connected to one power source 200, since there is a small difference of time of receiving power from one power source 200, the difference of phase value of power being supplied to each of the plurality of charging modules 100 is small.

Therefore, by grouping at least one charging module 100 whose measured phase value of power is within a predetermined phase range, from among the plurality of charging modules 100, into one group, the charging modules 100 that are connected to the same power source 200 and that are adjacent to one another, may be grouped.

In various embodiments, each of the plurality of charging modules 100 may use at least one method from among the three methods mentioned above (for example: the first method of grouping the plurality of charging modules using counting time the power was supplied (for example: FIGS. 3 and 4), the second method of grouping the plurality of charging modules using the advertising packet (for example: FIGS. 5 and 6), and the third method of grouping the plurality of charging modules using the phase value of power supplied to each of the plurality of charging modules (for example: FIGS. 7 and 8)), to group the plurality of charging modules 100, but there is no limitation thereto, and it is possible to consider two or more of the first method, the second method, and the third method, to select candidate charging modules to be grouped into one group, and compare the selected candidate charging modules, to select final charging modules to be grouped into one group.

In various embodiments, in the case where at least one charging module, from among the plurality of charging modules 100, is grouped into a first group, and a new charging module intends to receive power from the power source 200, it is possible to select any one charging module, from among the at least one charging module 100, as a representative charging module, and apply at least one of the first method, the second method, and the third method to the representative charging module and to the new charging module, to determine whether to group the new charging module into the first group.

Here, in the case where it is determined to group the new charging module into the first group, it is possible to connect the new charging module with the at least one charging module included in the first group via one communication network to enable mutual information sharing.

In various embodiments, in the case where at least one charging module, from among the plurality of charging modules 100, is grouped into the first group, and a new charging module intends to receive power from the power source 200, it is possible to disassemble the first group, and use at least one of the first method, the second method, and the third method, to reperform a grouping operation regarding the plurality of charging modules 100, including the new charging module.

In various embodiments, a computing apparatus may connect at least one charging module 100 grouped into one group through the first method, the second method, and the third method, via one communication network, and may control to enable mutual information sharing between the at least one charging module 100 grouped into one group. Hereinbelow, description will be made with reference to FIG. 9.

FIG. 9 is a view illustrating a configuration of connecting the charging modules grouped into one group via one communication network, in various embodiments.

Referring to FIG. 9, the computing apparatus may connect at least one charging module 100 grouped into one group via one communication network. For example, the first charging module 100-1 may connect at least one charging module 100 grouped into one group with one another via the communication network for PLC communication method, P2P communication method, Pulse Width Modulation (PWM) communication, Controller Area Network (CAN) communication, Media Oriented Systems Transport (MOST) communication, Local Interconnect Network (LIN) communication, Bluetooth communication, ALOHA communication, or Beacon communication.

Thereafter, the first charging module 100-1 may use the one communication network to provide information about each of the at least one charging module grouped into one group, to the at least one charging module grouped into one group, so that each of the at least one charging module included in one group can recognize the group to which it belongs and the information about other charging modules belonging to the same group.

Further, at least one charging module included in one group may use the one communication network to transmit charging state information of itself (for example: charged amount, charging operation information (fast charging and slow charging), charged state (for example: awaiting charging, charging, charging finished)) to other charging modules, so that the charging state information can be mutually shared between the at least one charging module included in one group.

In various embodiments, at least one charging module included in one group, in response to its charging state information being changed, may automatically share the changed charging state information with other charging modules included in the same group.

In various embodiments, at least one charging module included in one group may automatically share its charging state information with other charging modules included in the same group at every preset period.

Thereafter, each of the at least one charging module included in one group may individually determine the amount of power to be supplied, and receive the power from the power source 200 according to the determined amount of power.

Here, each of the at least one charging module included in one group may determine the amount of power based on its charging state information, the charging state information of other charging modules shared via one communication network, and the order of connection to the one power source 200. For example, the amount of power may be determined such that, from among the at least one charging module included in one group, the charging module of a fast charging mode or that requires a relatively greater amount of power can receive more power.

In addition, by assigning weighted values according to the order in which they are connected to one power source 200, the amount of power may be determined such that, from among the at least one charging module included in one group, the charging module first connected to one power source 200, can receive more power than the charging module connected to the power source 200 later.

In various embodiments, in the case where a total sum of the amount of power determined for each of the at least one charging module included in one group exceeds the maximum amount of power suppliable from one power source 200, the charging module connected to one power source 200 the last according to the order in which one power source 200 is connected may be sequentially excluded from the group or the charging state may be set to a pending state.

Thereafter, in the case where power supply to any one or more charging modules, from among the at least one charging module included in one group, is finished (for example: when charging of the electric vehicle 300 connected with any one or more charging modules is finished and thus the connector 110 and the electric vehicle 300 are separated from each other, or even if the connector 110 and the electric vehicle 300 are connected to each other, the charging is finished and thus power supply is stopped), and additional power supply to the charging module is possible (for example: when the total sum of the amount of power determined by each of the at least one charging module included in one group is less than the maximum amount of power suppliable from one power source 200), the charging module that had been excluded from the group according to the order in which one power source 200 is connected may be reincluded into the group again, or the charging state of the charging module that had been set to the pending state can be changed back to a charging start state.

In various embodiments, in the case where the amount of power determined for each of the at least one charging module 100 (for example: fixed type charging module) included in one group exceeds the maximum amount of power suppliable from one power source 200, additional power for the fixed type charging module may be supplied using the mobile type charging module 100' whose battery is fully charged, from among the mobile type charging module 100' having a separate battery inside therein.

That is, the mobile type charging module 100' may be set to have different uses depending on situations and time zones, so that at dawn when charging demand is relatively low or when the amount of power determined for each of the at least one charging module 100 (for example: fixed type charging module) is not more than the maximum amount of power suppliable from one power source 200, the electric vehicle 300 may be connected and the battery may be charged, but during the daytime when charging demand is high or in the evening or when the amount of power determined for each of the at least one charging module 100 (for example: fixed type charging module) exceeds the maximum amount of power suppliable from one power source 200, the mobile type charging module 100' may be set to play the function of supplying power in order to charge the fixed type charging module by assisting the power source 200.

The method for supplying power through grouping of charging modules for electric vehicle mentioned above was described with reference to the flowchart illustrated in the drawings. For simple explanation, the method of supplying power through grouping of charging modules for electric vehicle has been described with illustrations of a series of blocks, but the present disclosure is not limited to the order of the aforementioned blocks, and some blocks may be performed in a different order from that illustrated and disclosed in the present specification or may be performed at the same time. Further, a new block not disclosed in the present disclosure and drawings may be added, or may be performed with some blocks deleted or changed. Hereinbelow, referring to FIG. 10, a hardware configuration of the apparatus for supplying power through grouping of charging modules for electric vehicle according to embodiments of the present disclosure will be described.

FIG. 10 is a hardware configuration view of the apparatus for supplying power through grouping of charging modules for electric vehicle according to another embodiment of the present disclosure.

Referring to FIG. 10, an apparatus for supplying power (or computing apparatus) through grouping of charging modules for electric vehicle according to another embodiment of the present disclosure (for example: a control part 120 provided in each of the plurality of charging modules 100 or a computing server separately provided outside the plurality of charging modules 100)(hereinafter "computing apparatus 400") may include one or more processors 410, memory 420 for loading a computer program 451 that is performed by the processor 410, bus 430, communication interface 440, and a storage 450 for storing the computer program 451. Here, in FIG. 10, only the components related to the embodiment of the present disclosure are illustrated. Therefore, one of ordinary skill in the art to which the present disclosure pertains could see that general-purpose components other than those shown in FIG. 10 may be further included.

The processor 410 controls the overall operations of each configuration of the computing apparatus 500. The processor 410 may be configured to include a Central Processing Unit (CPU), Micro Processor Unit (MPU), Micro Controller Unit (MCU), Graphic Processing Unit (GPU), or any type of processor well known in the art.

Further, the processor 410 may perform an operation for at least one application or program for executing the method according to the embodiments of the present disclosure, and the computing apparatus 400 may be provided with one or more processors.

In various embodiments, the processor 410 may further include a Random Access Memory (RAM, not illustrated) and Read-Only Memory (ROM, not illustrated) for temporarily and/or permanently storing signals (or data) processed inside the processor 410. Further, the processor 410 may be implemented in the form of a System on Chip (SoC) that includes at least one of a graphic processing part, RAM or ROM.

The memory 420 stores various data, instructions and/or information. The memory 420 may load the computer program 451 from the storage 450 in order to execute methods/operations according to various embodiments of the present disclosure. When the computer program 451 is loaded on the memory 420, the processor 410 may execute one or more instructions configuring the computer program 451, thereby performing the aforementioned methods/operations. The memory 420 may be implemented as a volatile memory such as RAM, but the technical scope of the present disclosure is not limited thereto.

The bus 430 provides a communication function between the components of the computing apparatus 400. The bus 430 may be implemented in various forms of bus such as an address Bus, Data Bus, and Control Bus, etc.

The communication interface 440 supports wired and wireless Internet communication of the computing apparatus 500. Further, the communication interface 440 may support various communication methods besides Internet communication. For this purpose, the communication interface 440 may be configured to include communication modules well known in the related art of the present disclosure. In some embodiments, the communication interface 440 may be omitted.

The storage 450 may store the computer program 451 non-temporarily. When performing a precision diagnosis module suggesting process through the computing apparatus 400, the storage 450 may store various information and software (for example: grouping software for a plurality of charging modules) necessary for providing the method for supplying power through grouping of charging modules for electric vehicle.

The storage 450 may be configured to include a non-volatile memory such as a Read Only Memory (ROM), Erasable Programmable ROM (EPROM), Electrically Erasable Programmable ROM (EEPROM), and flash memory, hard disk, removable disk, or any type of computer-readable recording medium well known in the related art that the present disclosure pertains to.

The computer program 451 may include one or more instructions for making the processor 410 to perform the methods/operations according to various embodiments of the present disclosure when being loaded on the memory 420. That is, the processor 410 may perform the methods/ operations of various embodiments of the present disclosure by executing those one or more instructions.

In one embodiment, the computer program 451 may include a step of outputting a first signal in response to receiving power from the power source, a step of collecting a plurality of second signals output in response to each of a plurality of charging modules receiving power, and a step of selecting at least one charging module, from among the plurality of charging modules, using a parameter of the first signal and of the plurality of second signals, and grouping into one group with the selected at least one charging module.

The steps of the method or algorithm described in connection with an embodiment of the present disclosure may be implemented directly in hardware, or as a software module being executed by hardware, or by a combination thereof. The software module may reside in Random Access Memory (RAM), Read Only Memory (ROM), Erasable Programmable ROM (EPROM), Electrically Erasable Programmable ROM (EEPROM), flash memory, hard disk, removable disk, CD-ROM, or any type of computer-readable recording medium well known in the related art to which the present disclosure pertains.

Components of the present disclosure may be implemented as a program (or application) to be executed in combination with a computer, which is hardware, and stored in a medium. Components of the present disclosure may be implemented as software programming or software components, and similarly, embodiments may include various algorithms implemented as data structures, processes, routines, or combinations of other programming constructs, including programming or scripting language such as C, C++, Java, assembler, etc. Functional aspects may be implemented in an algorithm executed on one or more processors.

As mentioned above, although embodiments of the present disclosure have been described with reference to the accompanying drawings, those skilled in the related art to which the present disclosure pertains will understand that the present disclosure can be implemented in other specific forms without changing its technical spirit or essential features. Therefore, it should be understood that the embodiments described above are illustrative in all respects and not restrictive.

What is claimed is:

1. A method for supplying power for electric vehicle, the method being performed by a plurality of mobile charging modules, the method comprising:
   receiving, by the plurality of mobile charging modules, power from a power source;
   outputting, by a first mobile charging module of the plurality of mobile charging modules, a first signal in response to receiving the power from the power source;
   collecting, by the first mobile charging module, a plurality of second signals, which have been outputted by second mobile charging modules of the plurality of mobile charging modules in response to receiving the power from the power source;
   selecting, by the first mobile charging module, one or more second charging modules of the plurality of charging modules using a parameter of the first signal and a parameter of the plurality of second signals;
   grouping, by the first mobile charging module, the first mobile charging module and the selected one or more second charging modules into one group; and
   determining, by the first mobile charging module, an amount of power supplying by the grouped charging modules to connected devices by sharing of information between the grouped charging modules, and receiving, by the grouped charging modules, the determined amount of power from the power source.

2. The method according to claim 1,
wherein the first signal comprises a first clock signal, and the plurality of second signals comprise a plurality of second clock signals, and the parameter of the first signal comprises a first counting value obtained by counting the first clock signal, and the parameter of the plurality of second signals comprises a plurality of second counting values obtained by counting each of the plurality of second clock signals, and
the grouping into one group comprises selecting at least one second counting value, from among the plurality of second counting values, whose difference from the first counting value is not more than a certain size, and grouping into one group with at least one charging module corresponding to the selected at least one second counting value.

3. The method according to claim 1,
wherein the first signal comprises a first clock signal, the plurality of second signals comprise a plurality of second clock signals, the parameter of the first signal comprises a first counting value obtained by counting the first clock signal, and the parameter of the plurality of second signals comprises a plurality of second counting values obtained by counting each of the plurality of second clock signals, and
the grouping into one group comprises calculating a difference between the first counting value and a predetermined reference time point, to calculate a first time point regarding a time point of receiving power from the power source, and calculating a difference between the plurality of second counting values and the predetermined reference time point, to calculate a plurality of second time points regarding a time point when each of the plurality of charging modules received power; and
selecting at least one second time point included within a certain time range based on the first time point from among the plurality of second time points, and grouping into one group with at least one charging module that received power at the selected at least one second time point.

4. The method according to claim 3,
wherein the calculating comprises calculating a signal delay time regarding each of the plurality of charging modules using the plurality of second clock signals collected from each of the plurality of charging modules, and correcting the predetermined reference time point for each of the plurality of charging modules based on the calculated signal delay time.

5. The method according to claim 3,
wherein the calculating comprises determining a unit time for counting the first clock signal and the plurality of second clock signals based on the size of the certain time range, and counting each of the first clock signal and the plurality of second clock signals based on the determined unit time, thereby calculating the first counting value and the plurality of second counting values.

6. The method according to claim 1,
wherein the first signal comprises a first advertising packet output as Bluetooth advertise is initiated in response to receiving power, the plurality of second signals comprise a plurality of second advertising packets output as the Bluetooth advertise is initiated in response to each of the plurality of charging modules receiving power, the parameter of the first signal comprises a time of outputting the first advertising packet, and the parameter of the plurality of second signals comprises a time of receiving each of the plurality of second advertising packets, and the grouping into one group comprises selecting at least one second advertising packet received within a certain time range based on the time of outputting the first advertising packet from among the plurality of second advertising packets, and grouping into one group with at least one charging module that transmitted the selected at least one second advertising packet.

7. The method according to claim 1, wherein the first signal comprises a first voltage signal regarding the power supplied from the power source, the plurality of second signals comprise a plurality of second voltage signals regarding the power each of the plurality of charging modules received, the parameter of the first signal comprises a phase value of the first voltage signal, and the parameter of the plurality of second signals comprises a phase value of the plurality of second voltage signals, and the grouping into on group comprises selecting at least one second voltage signal included within a certain phase range based on the phase value of the first voltage signal from among the plurality of second voltage signals, and grouping into one group with at least one charging module corresponding to the selected at least one second voltage signal.

8. An apparatus for supplying power for electric vehicle, the apparatus comprising:

a processor;
a network interface;
a memory; and
a computer program that may be loaded in the memory, and
executed by the processor,
wherein the computer program comprises instructions for:
receiving, by a plurality of mobile charging modules, power from a power source;
outputting, by a first mobile charging module of the plurality of mobile charging modules, a first signal in response to receiving the power from the power source;
outputting, by second mobile charging modules of the plurality of mobile charging modules, a plurality of second signals in response to receiving the power from the power source;
collecting the first signal and the plurality of second signals;
selecting one or more second charging modules of the plurality of charging modules using a parameter of the first signal and a parameter of the plurality of second signals;
grouping the first mobile charging module and the selected one or more second charging modules into one group; and
determining an amount of power supplying by the grouped charging modules by sharing of information between the grouped charging modules, and receiving, by the grouped charging modules, the determined amount of power from the power source.

9. A non-transitory computer-readable recording medium storing a computer program, coupled with a computer hardware, for executing operations of:

receiving, by a plurality of mobile charging modules, power from a power source;
outputting, by a first mobile charging module of the plurality of mobile charging modules, a first signal in response to receiving the power from the power source;
outputting, by second mobile charging modules of the plurality of mobile charging modules, a plurality of second signals in response to receiving the power from the power source;
collecting the first signal and the plurality of second signals;
selecting one or more second charging modules of the plurality of charging modules using a parameter of the first signal and a parameter of the plurality of second signals;
grouping the first mobile charging module and the selected one or more second charging modules into one group; and
determining an amount of power supplying by the grouped charging modules by sharing of information between the grouped charging modules, and receiving, by the grouped charging modules, the determined amount of power from the power source.

* * * * *